(No Model.)
E. W. FLAGG.
THRASHING MACHINE.
No. 454,466. Patented June 23, 1891.
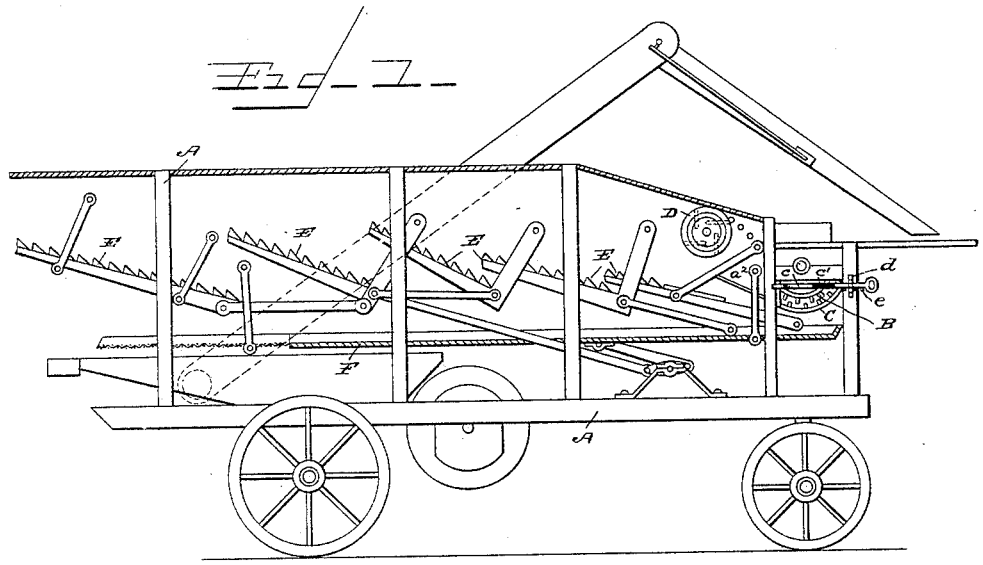
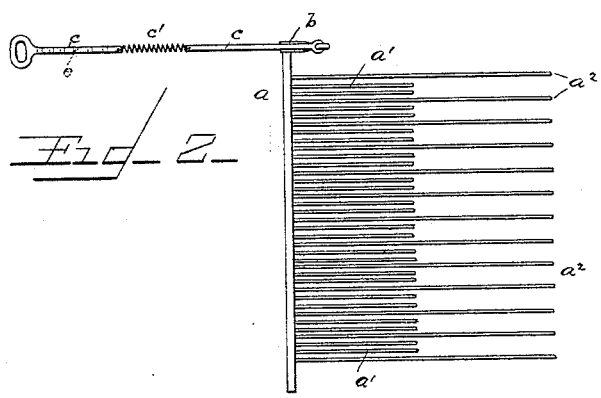
Witnesses=
Andy C Rawlings
G. M. Copenhaver
Inventor=
Eli W. Flagg
By A. M. Smith & Son
ATTORNEYS.
THE NORRIS PETERS CO., PHOTO-LITHO., WASHINGTON, D. C.

UNITED STATES PATENT OFFICE.

ELI W. FLAGG, OF BATTLE CREEK, MICHIGAN, ASSIGNOR TO THE NICHOLS & SHEPARD COMPANY, OF SAME PLACE.

THRASHING-MACHINE.

SPECIFICATION forming part of Letters Patent No. 454,466, dated June 23, 1891.

Application filed March 21, 1891. Serial No. 385,890. (No model.)

*To all whom it may concern:*

Be it known that I, ELI W. FLAGG, a citizen of the United States, and a resident of Battle Creek, county of Calhoun, and State of Michigan, have invented a new and useful Improvement in Thrashing-Machines, of which the following is a full, clear, and exact description, reference being had to the accompanying drawings, making part of this specification.

The invention relates to a novel construction and arrangement of straw-guide interposed between the thrashing-machine concave and the beater-reel and straw-carrier proper; and it consists in a guide composed of longitudinally-arranged rods or fingers supported at their forward ends only by a rock-shaft pivoted in close proximity to the discharge end of the concave to receive the straw and grain therefrom and guide it to the beater; in a novel construction of said guide to prevent the straw from being forced through it by the action of the thrashing-cylinder thereon, and for facilitating the passage of the straw and the escape of the grain, and in means adapting said guide to yield automatically when required to permit the escape from between it and the beater of bundles or such masses of straw as would otherwise clog the machine, all as hereinafter described and claimed.

In the accompanying drawings, Figure 1 is a side elevation of a thrashing-machine with the adjacent side casing removed and partly in section to show the internal arrangement with my improvements applied, and Fig. 2 is a plan view of the improved straw-guide detached.

The machine in its organization is similar to that shown and described in the patent to A. J. Hoag, February 19, 1884, No. 293,876, but in that and in the usual construction of these machines the straw passes from the thrasher concave onto a rigid cast-iron grating made up ordinarily of transverse grate-bars united to supporting longitudinal end bars, but sometimes of short longitudinal bars united at both ends to supporting cross-bars. In these constructions it has been found that the heavy downward thrust of the cylinder on the straw tended to force the straw down between the bars or slats of the grating, and these being arranged crosswise or united at the discharge end to a cross-bar, the straw was driven through far enough to be caught by and doubled over on such bars in such manner as to seriously retard its passage and interfere with the escape of the grain through the grating. Again, the straw-guide for directing the straw to the beater was necessarily arranged at the discharge end of this grating, and this necessarily made the fingers short and the angle thereof so abrupt as to materially interfere with the free passage of the straw to the beater and from the beater between it and the guide, and as a result the grain frequently became jammed or crowded at that point and the beater could only imperfectly perform its work.

The object of the present improvement is to remedy the difficulties above referred to, to facilitate the escape of the grain from the straw and the delivery of the latter to and its escape from the beater, as will appear.

A indicates the frame-work of the machine; B, the thrashing-cylinder; C, the concave; D, the reel-beater; E, the sectional straw-carrier, and F the grain pan or screen receiving the grain from the carrier, said parts being constructed and arranged in the usual manner.

Dispensing with the grating referred to at the discharge end of the concave, I locate in close proximity to said end a transverse rock-shaft $a$, journaled at its ends in suitable bearings on the frame or grooved side castings supporting the concave, and to this shaft a series of rearwardly-extending fingers $a'$ and $a^2$ are rigidly secured, the fingers $a'$ being of a length about equal to the width from front to rear of the cast-iron grating usually employed at that point and the longer ones $a^2$ extending nearly or quite to the vertical plane of the beater-reel axis. Two short rods or fingers $a'$ $a'$ are shown interposed between each pair of long ones, thereby giving a close grating surface adjacent to the concave where the down-thrust of the straw by the cylinder is received for preventing the beating of the straw down between the fingers by the action of the cylinder, while the longer fingers serve to guide the straw lightly onto the beater after the point of such down-thrust is passed, and form an open grating through which the grain can readily escape to the grain-pan below. These fingers are unsupported except at their forward ends, and so present no obstruction to the free and easy movement of the straw back to the beater. The relative arrangement of the long and short fingers may of course be varied so long as the results described are attained. By placing the rock-shaft close up to the concave a longer reach of the guide-fingers is obtained than where the ordinary grating referred to is interposed between the concave and guide, and a less abrupt angle of the guide and consequent ease of delivery of the straw to the beater is secured.

Any suitable means may be used for adjusting the angle of the guide and holding it at the desired adjustment. I have shown the rock-shaft provided at one end on the side of the machine on which the attendant stands with an upright crank-arm $b$, to the upper end of which is pivoted a rod $c$, which extends forward into convenient position to be operated by the attendant. This may pass through a guiding loop-bracket, (indicated at $d$,) and may be provided with teeth, as indicated at $e$, for engaging said bracket and holding the rod $c$ and shaft $a$ at any desired adjustment. The rod $c$ is shown divided, and is provided between the two parts thereof with a spring $c'$ of the spiral form indicated, or of other suitable form which is of sufficient rigidity to hold the guide at the desired adjustment but which will allow said guide to yield in case a bundle should accidentally escape and pass the cylinder or other heavy mass should be caught between the guide and beater and which could not readily pass the beater unless the guide were permitted to yield. The long fingers $a^2$ of the guide may be sufficiently elastic, if desired, to facilitate the passage of the straw and improve the action of the beater thereon.

By the arrangement dispensing with the grating in front of the rock-shaft of the straw-guide said shaft is brought near the operator and the handle for operating it is brought within his easy reach, thereby enabling him to dispense with the aid of an assistant for adjusting the guide.

Having now described my invention, I claim as new and desire to secure by Letters Patent—

1. In a thrashing-machine, a straw-guide composed of fingers of different lengths longitudinally arranged in a common plane and rigidly connected at their forward ends to a rod or shaft pivoted immediately adjoining the rear end of the thrasher-concave to adapt said fingers to receive the grain directly therefrom and permit the adjustment of their angle, in combination with and extending between said concave and the beater, substantially as described.

2. The straw-guide composed of fingers of different lengths longitudinally arranged in a common plane and supported at their forward ends by a rod or shaft pivoted in immediate proximity with the rear end of the thrasher-concave, to adapt the fingers to receive the straw directly therefrom, in combination with a crank arm or lever on said shaft, a rod or handle for adjusting said arm, shaft, and fingers, and a spring permitting the fingers to yield to obstructing matter, all arranged and operating substantially as described.

In testimony whereof I have hereunto set my hand this 19th day of March, A. D. 1891.

ELI W. FLAGG.

Witnesses:
CHESTER P. ALDRICH,
ALFRED A. ELLSWORTH.